United States Patent [19]

Nishioka et al.

[11] 4,010,382
[45] Mar. 1, 1977

[54] PUSH-BUTTON TYPE PULSE GENERATING SWITCH

[75] Inventors: Matsuo Nishioka; Shunzo Oka, both of Hirakata, Japan

[73] Assignee: Matsushita Electric Industrial Co., Ltd., Japan

[22] Filed: Dec. 26, 1974

[21] Appl. No.: 536,374

[30] Foreign Application Priority Data

| Dec. 29, 1973 | Japan | 48-2696 |
| Dec. 29, 1973 | Japan | 48-3379 |
| Dec. 29, 1973 | Japan | 48-3380 |
| Dec. 29, 1973 | Japan | 48-3381 |
| Dec. 29, 1973 | Japan | 48-3382 |
| Dec. 29, 1973 | Japan | 48-3383 |

[52] U.S. Cl. .............................. 307/106; 200/5 R; 200/160
[51] Int. Cl.² ......................................... H03K 3/00
[58] Field of Search ............ 200/160, 5; 179/90 K, 179/2 DP; 340/365 R, 5; 307/106

[56] References Cited

UNITED STATES PATENTS 3,004,106  10/1961  Low ................. 179/90 K

*Primary Examiner*—Robert K. Schaefer
*Assistant Examiner*—Morris Ginsburg
*Attorney, Agent, or Firm*—Burgess Ryan and Wayne

[57] ABSTRACT

The present invention discloses a mechanical pushbutton type pulse generating switch for use in a telephone set comprising, in general, pulse generating switch units, a push-break return-make switch unit, and an end pulse generating switch unit. The pulse generating switch unit has a common normally closed contact attached to one side surface of an operating or pushbutton shaft having a polygonal cross sectional configuration and a plurality of make-break contact groups attached to the remaining side surfaces of the operating shaft and brushes or wipers disposed in opposed relation with and for contact with the common and make-break contacts respectively. The push-break return-make switch unit circuit is connected in series to a parallel circuit consisting of the pulse generating switch unit circuit and the end pulse generating switch unit circuit. The push-break return-make switch unit is so arranged that the number pulses may be generated only in the return stroke of the operating shaft after the latter has been completely depressed, and the end pulse is generated immediately before the operating shaft is returned to its initial or inoperative position and immediately before the push-break return-make switch unit is opened.

24 Claims, 32 Drawing Figures

FIG. 23
FIG. 24
FIG. 25
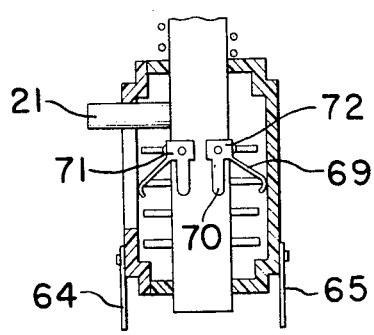
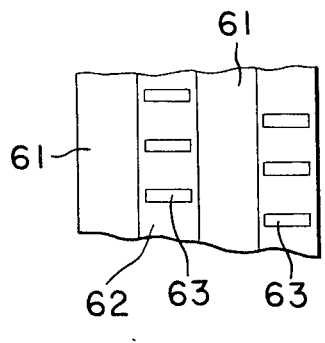
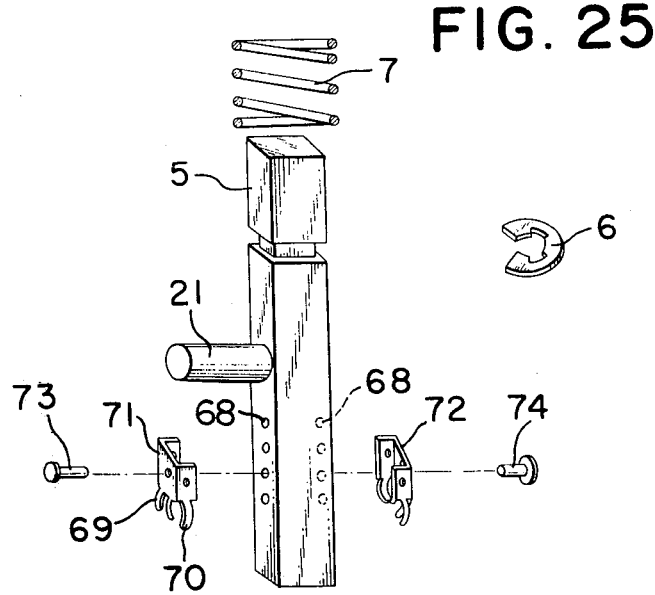
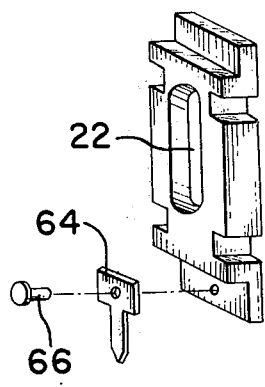
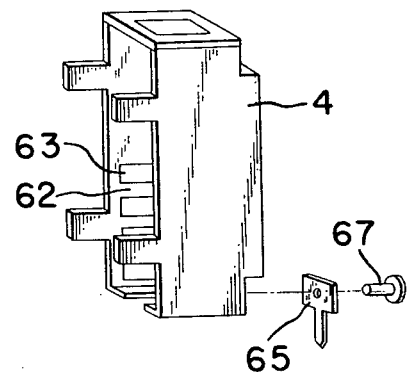

PUSH-BUTTON TYPE PULSE GENERATING SWITCH

BACKGROUND OF THE INVENTION

The present invention relates to a push-button type pulse generating switch.

The conventional push-button type pulse generating switches are, in general, so arranged as to electronically generate the pulses, so that they are very expensive to manufacture.

SUMMARY OF THE INVENTION

One of the objects of the present invention is, therefore, to provide a push-button type pulse generating switch whose manufacturing cost is low.

Another object of the present is to provide a push-button type pulse generating switch employing mainly a mechanical mechanism for generating the pulses.

A further object of the present invention is to provide a push-button type pulse generating switch highly reliable and dependable in operation.

A still further object of the present invention is to provide a push-button type pulse generating switch which is in a unit form light in weight and compact in size and is adjusted in a simple manner in order to change the number of pulses to be generated.

Briefly stated, a push-button type pulse generating switch in accordance with the present invention comprises, in general, a plurality of pulse generating switch units or switching means (A), a push-break return-make switch unit or switching means (B), and an end pulse generating switch unit or switching means (C).

The pulse generating switch unit (A) has a common normally closed contact and a plurality of make-break contacts which mate brushes or wipers in the down and return strokes of an operating shaft or push-button shaft. The common and make-break contacts are attached to the operating shaft while the brushes are attached to the inner surface of a pulse generating switch case into which is axially slidably fitted the operating or push-button shaft, or the arrangements are vice versa.

The push-break return-make switch unit (B) comprises a switch electrically connected in series to the pulse generating switch unit (A) in such a way that the pulses may be generated only in the return stroke of the operating or push-button shaft, and a mechanism for actuating the switch.

The end pulse generating switch unit (C) has a function of generating the end pulse representative of the completion of the generation of the number pulses immediately before the operating or push-button shaft is returned to its initial or inoperative position and before the push-break return-make switch is opened. The end pulse generating switch is connected in parallel to the pulse generating switch and in series to the push-break return-make switch.

The above and other objects, advantages and features of the present invention will become more apparent from the following description of the preferred embodiments thereof taken in conjunction with the accompanying drawing.

BRIEF DESCRIPTION OF THE DRAWING

FIG. 23 is a longitudinal sectional view of a pulse generating switch unit of a fourth embodiment of the present invention;

FIG. 24 is a fragmentary developed view of a case therof; and

FIG. 25 is a perspective view, on enlarged scale thereof.

DESCRIPTION OF THE PREFERRED EMBODIMENTS

First Embodiment, FIGS. 1 through 16

Figure 4:
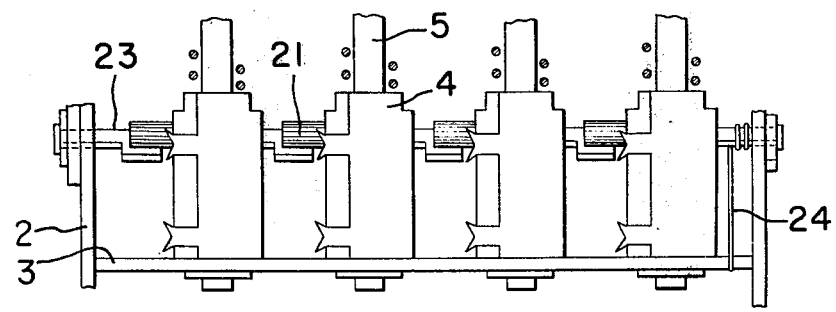
FIG. 4 is a side view thereof.
Figure 5:
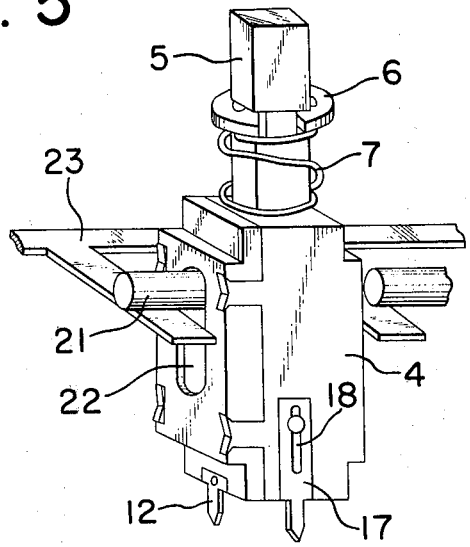
FIG. 5 is a perspective view of a pulse generating switch unit.
Figure 6:
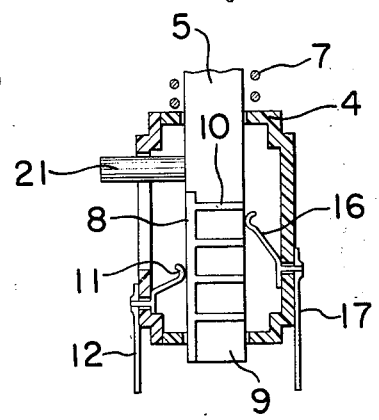
FIG. 6 is a longitudinal sectional view thereof.
Figure 7:
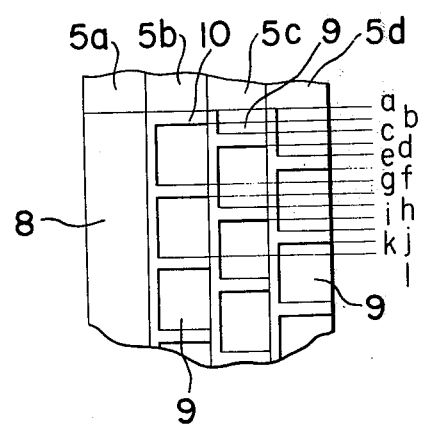
FIG. 7 is a fragmentary developed view of an operating shaft thereof.
Figure 8:
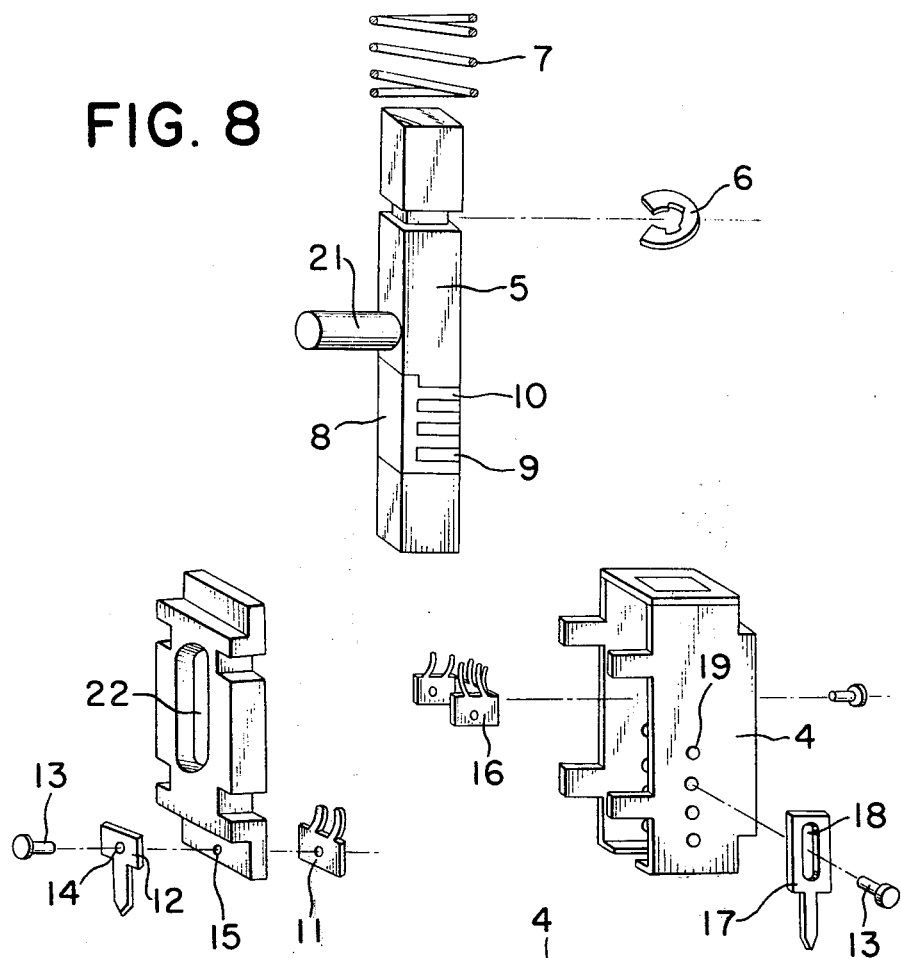
FIG. 8 is a perspective exploded view of the pulse generating switch unit.
Figure 9:
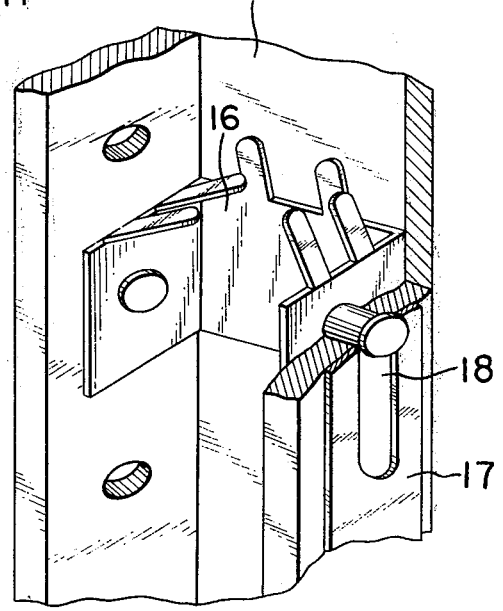
FIG. 9 is a fragmentary perspective view, on enlarged scale thereof illustrated a brush.

Referring to FIGS. 1 through 9, a pulse generating switch unit (A) will be described first. A plurality of switch cases 4 having a polygonal cross section configuration extend through and are attached to a top wall 1 and a bottom wall 3 which make up a casing with side walls 2. An operating or push-button shaft 5 which is made of an insulating material and has a cross sectional configuration similar to that of the mating switch case 4 is axially slidably fitted in each switch case 4, and a spring 7 is loaded between the top of the switch case 4 and a ring or spring seat 6 attached to the operating shaft 5 so that the latter is normally biased upwardly. As shown in FIGS. 6, 7, and 8, attached upon the four side surfaces at the lower portion of the operating shaft is a contact assembly which, as best shown in FIG. 7, comprises an elongated common contact 8, and three groups of comb-shaped and vertically equidistantly spaced apart make-break contacts 10 isolated from each other by insulating members 9. That is, the common contact 8 is attached on one side surface 5a of the operating shaft 5 while three groups of make break contacts 10 are attached on the remaining three side surfaces 5b, 5c, and 5d, respectively. The make-break contacts 10 are provided in order to generate the pulses as will be described in detail hereinafter.

Figure 1:
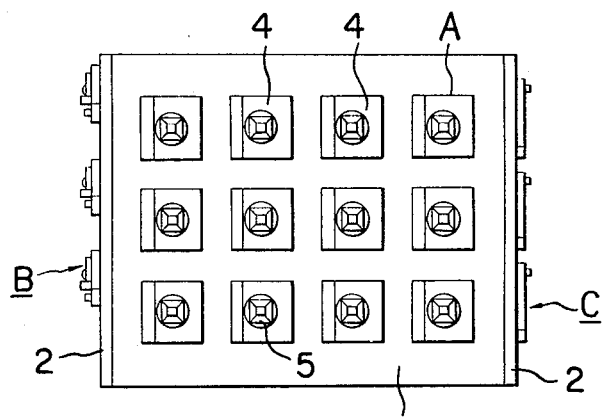
FIG. 1 is a top view of a first embodiment of the present invention.
Figure 2:
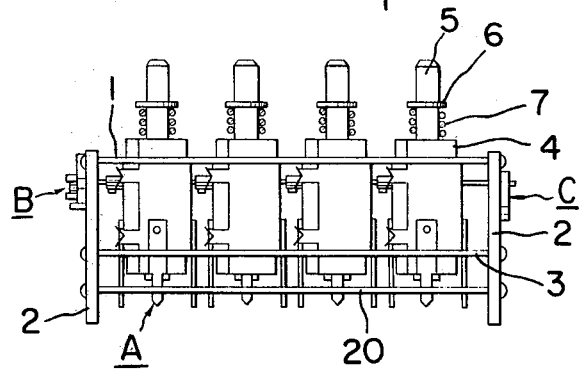
FIG. 2 is a side view thereof.
Figure 3:
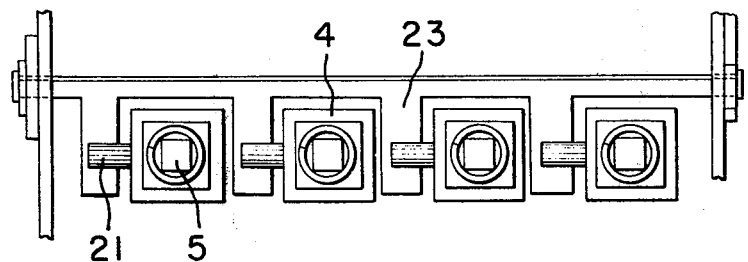
FIG. 3 is a fragmentary top view thereof, on enlarged scale, with its top wall removed.

As best shown in FIGS. 6 and 8, a brush or wiper 11 made of an elastic metal is attached to the inner side surface of the switch case 4 in opposed relation with the common contact 8 and is normally kept in contact with the common contact 8. That is, the common brush or wiper 11 is attached together with a brush terminal 12 to the side wall of the switch case 4 with a setscrew 13 screwed into screw holes 14 and 15 of the terminal 12 and the side wall of the switch case 4 as best shown in FIG. 8. In like manner, a brush or wiper assembly 16 (See FIG. 9) is attached to the remaining inner side surfaces of the switch case 4 in the opposed relation with the three make-break contact groups, respectively. That is, the brush or wiper assembly 16 is attached to the side walls of the switch case 4 together with a terminal 17 with screws 13 which is extended through an elongated slot 18 of the terminal 17 and is screwed into one of a plurality of screw holes 19 formed through the side walls of the switch case 4 as best shown in FIG. 8. Since the screw holes 19 are vertically equidistantly arrayed and the terminal 17 is provided with the vertically elongated slot 18, the position of the brush or wiper assembly 16 may be suitably adjusted. For instance, when it is desired to derive three number pulses, the brush assembly 16 is so attached that it may be brought into contact with the portion or position f of the contact assembly (see FIG. 7) when the operating shaft 5 is at the uppermost position; that is, when the operating shaft 5 is not depresssed. The terminals 12 and 17 are connected to a printed circuit board 20 as shown in FIG. 2.

A lateral projection 21 extends from one side surface of the operating shaft 5, outwardly extends through an elongated slot 22 formed through one side wall of the switch case 4, and engages a tooth of a comb-shaped connected rod 23 as best shown in FIG. 5. The connecting rod 23 is swingably supported between the side wall 2 of the casing as best shown in FIG. 4. Since the projection 21 normally rests upon the tooth of the connecting rod 23 as best shown in FIG. 5, the connecting rod 23 is caused to rotate when the operating shaft 5 is depressed. As shown in FIG. 4, a spring 24 is provided so that the teeth of the connecting rod 23 may be normally biased upwardly; that is, they may be pressed against the undersurfaces of the projections 21 and that the connecting rod 23 may be returned to its initial position when the operating rod 5 is released.

When the operating shaft 5 is depressed, the brush 11 is continuously slides over the common contact 8 while the brush assembly 16 intermittently and slidably contacts with the make-break contacts 10. The pulses equal in number to the make-break contacts 10 with which the brush assembly 16 is brought into contact may be generated in the return stroke of the operating shaft 5.

Figure 10:
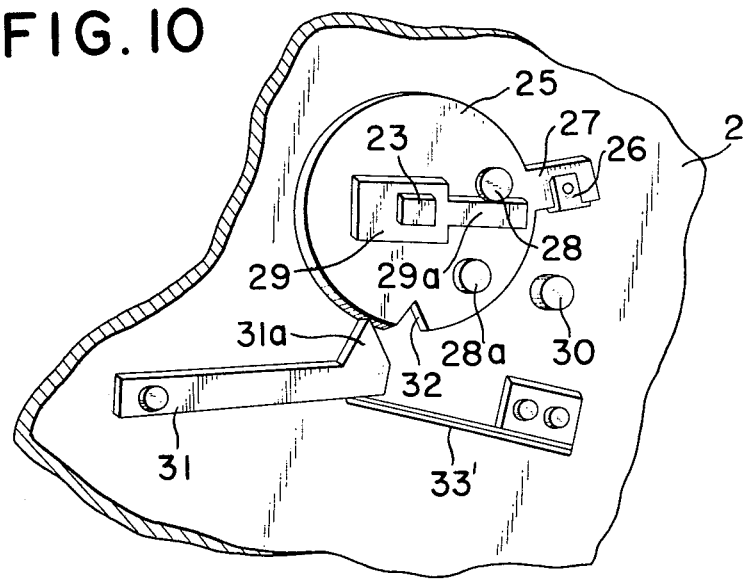
FIG. 10 is a perspective view of a push-break return-make switch unit.

Next, referring to FIGS. 10 and 11, a push-break return-make switch unit B will be described hereinafter. A rotary disk 25 which is freely or loosely attached to one end of the connecting rod 23 is provided with a radial projection 27 to which is attached a movable contact 26 and two projections or stoppers 28 and 28a which extend from the side surface. A driving lever 29 has its one end attached to one end of the connecting rod 23 for rotation in unison therewith and the other or free end thereof interposed between the two projections or stoppers 28 and 28d. A stationary contact 30 which mates with the movable contact 26 is attached to the side wall 2 in such a way that when the operating shaft 5 is at its lowermost position the movable contact 26 contacts the stationary contact 30 as will be described in more detail hereinafter. The distance or contact gap between the movable and stationary contacts 26 and 30 is made longer than the spacing between the projections or stoppers 28. The free end 31a of a pawl 31 swingably attached to the side wall 2 is adapted to drop into a notch 32 formed at the periphery of the rotary disk 25, and is biased by a leaf spring 33' so as to be pressed against the periphery of the rotary disk 25.

Figure 12:
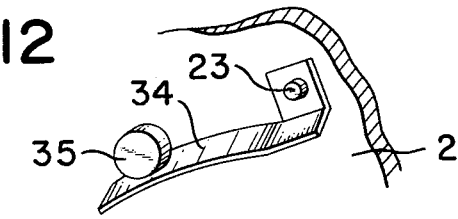
FIG. 12 is a perspective view of an end pulse generating switch unit.

Next, referring to FIG. 12, an end pulse generating switch unit C will be described. A contact arm 34 made of an elastic metal is attached to the other end of the connecting rod 23 for rotation in unison therewith, and resiliently contacts a stationary contact 35 attached to the side wall 2 when the operating shaft 5 is not depressed. The contact arm 34 and the stationary contact 35 are immediately separated from each other when the operating shaft 5 is depressed. The end pulse will be generated in a manner to be described in detail hereinafter. The end pulse is transmitted from the stationary contact to an external circuit (not shown).

Figure 15:
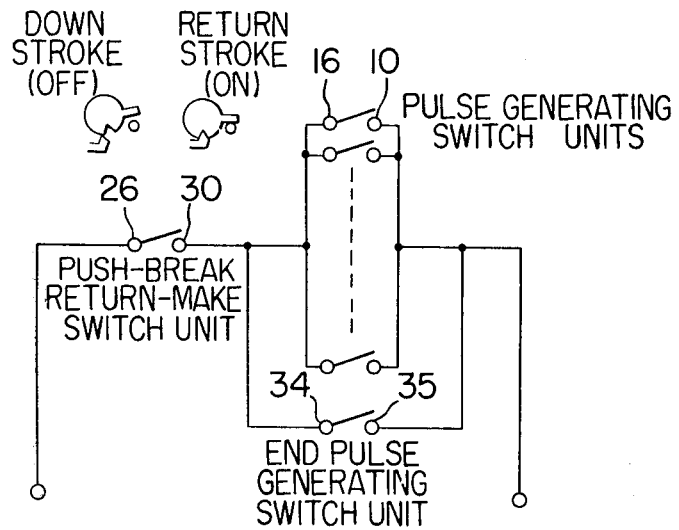
FIG. 15 is a circuit diagram illustrating the interconnection of the pulse generating switch units, the push-break return-make switch unit, and the end pulse generating switch unit.

As shown in FIG. 15, the end pulse switch unit C and the push-break return-make switch unit B are connected in series while the end pulse generating switch unit C and the pulse generating switch unit A are connected in parallel.

Figure 11A:
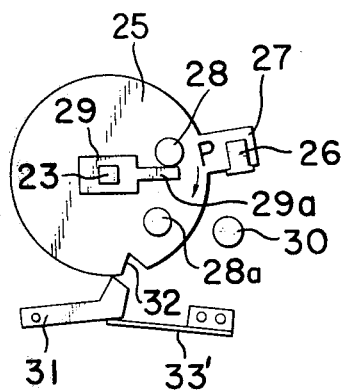
FIGS. 11A, 11B, and 11C are schematic views thereof used for the the explanation of the mode of operation thereof.
Figure 11C:
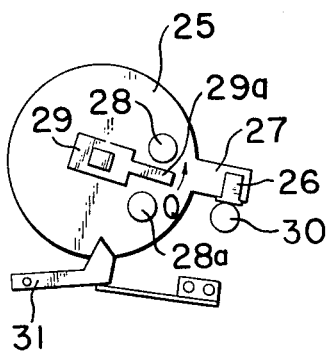
Figure 11B:
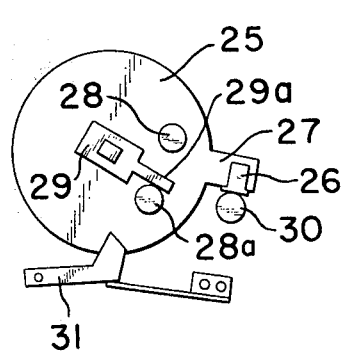

Next the mode of operation of the first embodiment will be described hereinafter. When the operating shaft 5 is depressed against the spring 7, its projections 21 pushes down the mating tooth of the connecting rod 23 (See FIG. 5) so that the driving lever 29 of the push-break return-make switch unit B is rotated away from the projection 28 in the clockwise direction as indicated by the arrow P in FIG. 11A from its initial position shown in FIGS. 10 and FIG. 11A. When the driving lever 29 contacts and pushes down the projection 28a, the rotary disk 25 is also caused to rotate in the clockwise direction so that the movable contact 26 contacts the stationary contact 30 when the operating shaft 5 reaches its lowermost position; that is, the end of the down stroke as shown in FIG. 11B. The free end 31a of the pawl 31 drops into the notch 32 of the rotary disk 25 so that the latter's rotation is stopped and the movable contact 26 is kept in contact with the stationary contact 30. When the depressing force is relieved from the operating shaft 5, the operating shaft 5, the rotary disk 25, and the driving lever 29 are returned to their initial positions under the force of the bias spring 7. The swing of the driving lever 29 from the stopper 28a to the stopper 28 is a free running; that is, the driving lever 29 will not cause the rotation of the rotary disk 25 during this stroke, so that the movable and stationary contacts 26 and 30 remain in contact with each other as shown in FIG. 11C. When the driving lever 29 finally contacts with and pushes up the stopper or projection 28, the rotary disk 25 is caused to rotated in the counterclockwise direction so that the movable contact 28 is separated away from the stationary contact 30. The movable and stationary contacts 26 and 30 are kept in contact with each other in the return stroke of the operating shaft 5, and the brush assembly 16 contacts the make-break contacts 10 on the operating shaft 5 so that the number pulses are derived as the output.

Figure 13:
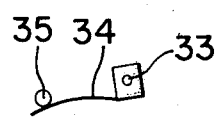
FIGS. 13A through 13F are diagrammatic views of the end pulse generating switch and the push-break return-make switch unit used for the explanation of the mode of operation thereof.
Figure 13:
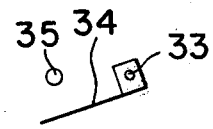
Figure 13:
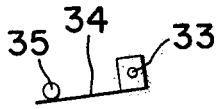
Figure 13:
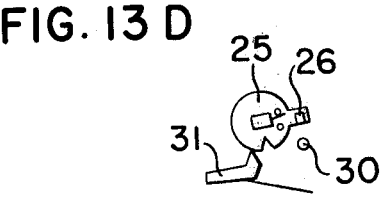
Figure 13:
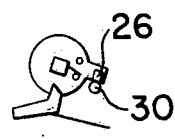
Figure 13:
Figure 14:
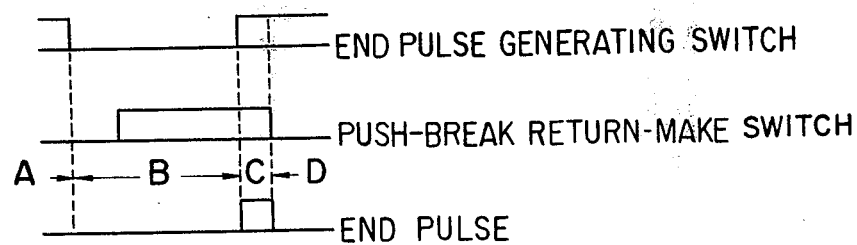
FIG. 14 is a time chart used in the explanation of the push-button type pulse generating switch in conjunction with FIGS. 13A through FIG. 13F.

Next, referring to FIGS. 12 and 13, the mode of operation of the end pulse generating switch unit (c) will be described. Before the operating shaft 5 is depressed, the movable and stationary contacts 34 and 35 contact each other as shown in FIGS. 12 and 13A so that the end pulse may be generated in any time when actuated. However the movable and stationary contacts 26 and 30 are separated as shown in FIG. 13D so that no end pulse is generated. Furthermore, even when the operating shaft 5 is depressed to its lowermost position, and stationary contacts 34 and 35 are separated from each other as shown in FIG. 13B so that no end pulse is generated. However, immediately before the operating shaft 5 is completely returned to its initial position, the movable and stationary contacts 34 and 35 contact each other as shown in FIG. 13C while the movable and stationary contacts 26 and 30 contact each other as shown in FIGS. 13F and 13E, the end pulse is derived as shown in FIG. 14. Thereafter, as shown in FIG. 13D, the movable and stationary contacts 26 and 30 are separated so that no end pulse may be derived.

Figure 16:
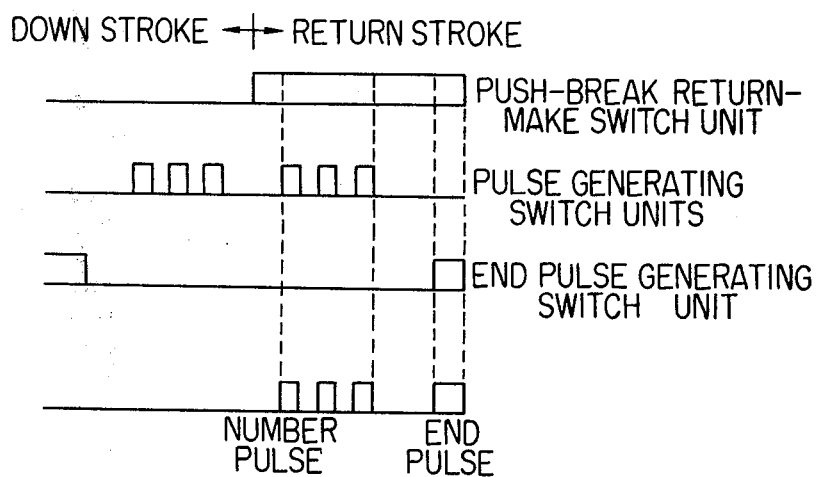
FIG. 16 is a time chart used for the explanation of the mode of operation of the first embodiment.

Thus when the push-break return-make switch unit B is actuated in the return stroke of the operating shaft 5 in the manner described above, the desired number pluses and and end pulse may be derived as shown in FIG. 16.

SECOND EMBODIMENT, FIGS. 17 THROUGH 19

Figure 17:
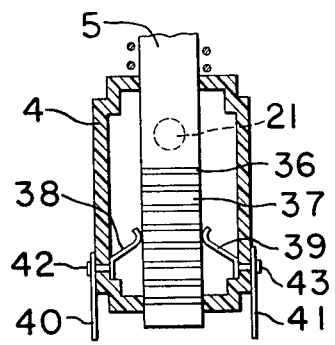
FIG. 17 is a longitudinal sectional view of a pulse generating switch unit of a second embodiment of the present invention.
Figure 18:
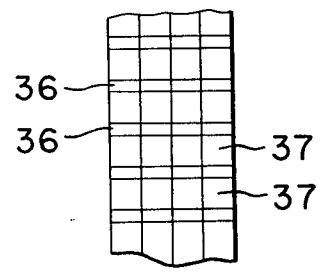
FIG. 18 is a developed view of an operating shaft thereof.
Figure 19:
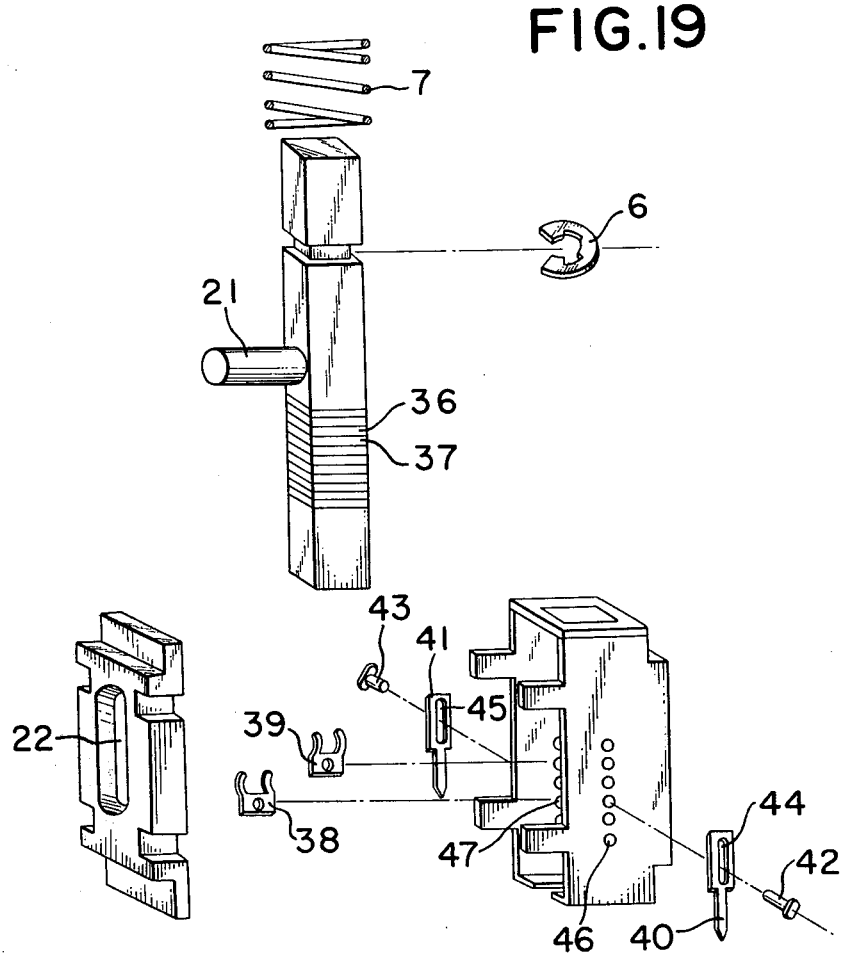
FIG. 19 is a perspective exploded view, on enlarged scale thereof.

Next, referring to FIGS. 17 through 19, the second embodiment of the present invention will be described. Attached to the side surface of the operating shaft 5 at the lower portion thereof are a plurality of ring-shaped contacts 36 for generating the pulses which are equidistantly vertically spaced apart from each other and isolated from each other with insulators 37. Attached to the opposing inner side surfaces of the switch case 4 are brushes 38 and 39 which are made of an elastic material and are resiliently pressed against the contacts 36. That is, as best shown in FIG. 17, the brushes 38 and 39 are attached together with terminals 40 and 41 with setscrews 42 and 43, respectively, to the opposing inner surfaces of the switch case 4. The set-screws 42 and 43 extend through elongated slots 44 and 45 of the terminals 40 and 41, and are screwed into suitable screws holes 46 formed through the side walls of the switch case 4. When the operating shaft 5 is depressed and then is returned under the force of the spring 7, the brushes 38 and 39 slide over the contacts 36. The number of contacts of the brushes 38 and 39 with the contacts 36 in the return stroke of the operating shaft 5 is equal to the number of the number pulses to be generated. Except the above arrangement, the second embodiment is substantially similar in construction and mode of operation to the first embodiment, so that further description shall not be made in this specification. However, the second embodiment has an advantage over the first embodiment that the fabrication and assembly of the contacts 10 may be much facilitated.

THIRD EMBODIMENT, FIGS. 20, 21 AND 22

Figure 20:
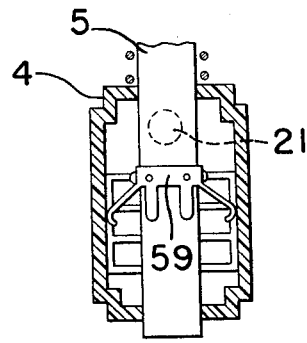
FIG. 20 is a longitudinal sectional view of a pulse generating switch unit of a third embodiment of the present invention.
Figure 21:
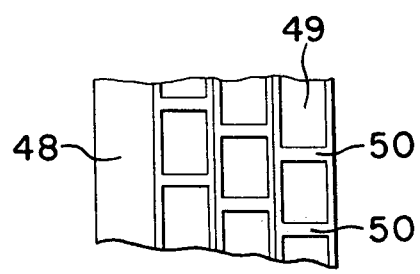
FIG. 21 is a fragmentary developed view of a case thereof.
Figure 22:
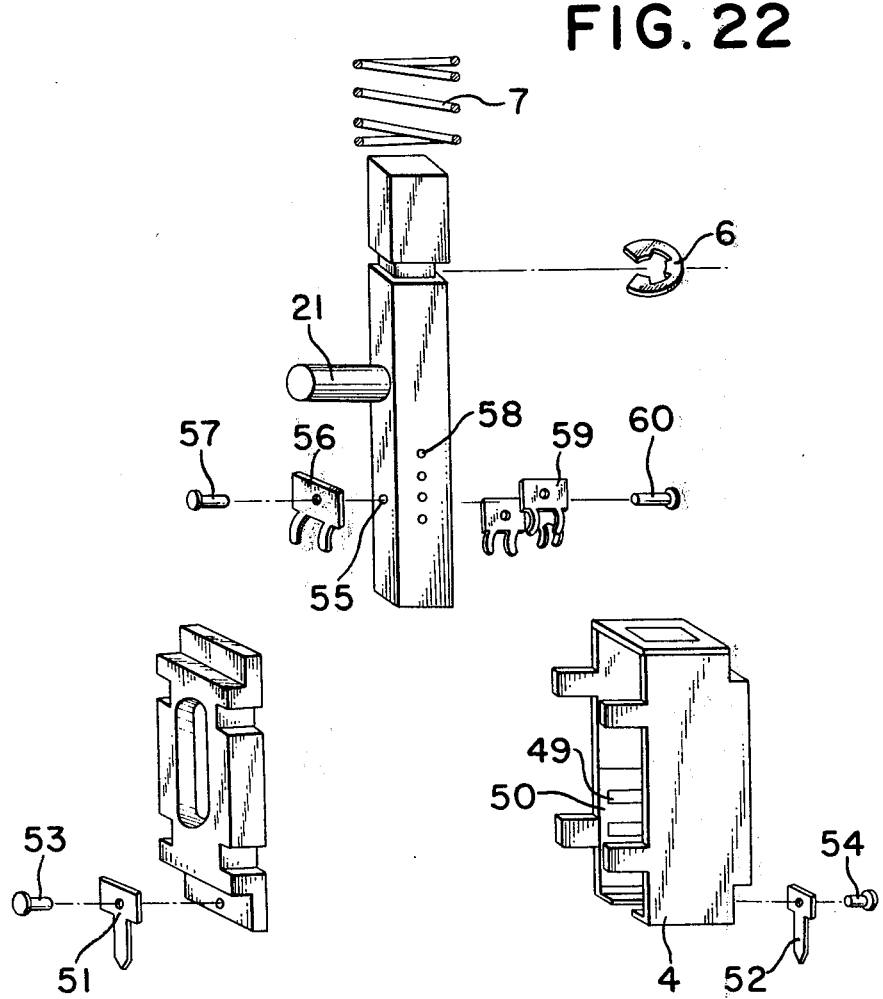
FIG. 22 is a perspective exploded view, on enlarged scale thereof.

Next, referring to FIGs. 20, 21 and 22, the third embodiment of the present invention will be described in which the positions of the contacts and the brushes or wipers are reversed. It is noted that the dimensions of FIGS. 20–22 are not consistent. Thus the members 49 in FIG. 21 are vertically elongated, while in FIG. 20 they appear horizontally elongated. In FIG. 22, the horizontal elongation is even more pronounced. As shown in FIGS. 20 through 22, attached to the inner surface of the switch case 4 is attached a contact assembly consisting of an elongated common contact 48 and three contact groups each consisting of a plurality of comb-shaped vertically equidistantly spaced apart make-break contacts 50 which are isolated from each other with insulators 49. Attached upon one side surface of the operating shaft is a brush or wiper 56 which is normally made into contact with the common contact 48 that is, thereofore, a normally closed contact. That is, the brush 56 is attached to one side surface of the operating shaft 5 with a setscrew 57 screwed into a screw hole 55 of the operating shaft as best shown in FIG. 22. A terminal 51 is attached to one side wall of the switch cases with a setscrew 53 as best shown in FIG. 22 and is made into electrical connection with the common contact 48. Another terminal 52 is attached to another side wall of the switch case 4 with a set screw 54, and is made into electrical contact with the make-break contacts 60. A brush assembly 59 which makes contact with the make-break contacts 50 attached on the three inner side walls of the switch case 4 is attached to the operating shaft 5 with setscrews 60 screwed into suitable screw holes in the operating shaft 5 as best shown in FIG. 22. Since a plurality of screw holes which are vertically spaced from each other are provided, the position of the brush assembly 59 may be suitably adjusted so that a desired number of number pulses may be derived. Except the above described arrangement, the third embodiment is substantially similar in construction and mode of operation to the first embodiment so that further description shall not be made in this specification.

FOURTH EMBODIMENT, FIGS. 23 THROUGH 25

The fourth embodiment shown in FIGS. 23, 24, and 25 is substantially similar in construction to the third embodiment described above with reference to FIGS. 20, 21, and 22 except that two independent contact assemblies each consisting of, as best shown in FIG. 24, a common contact 61 and a group of make-break contacts 63 which are vertically equidistantly spaced apart from each other and isolated from each other with insulators 62, are attached on the inner side surfaces of the switch or push-button case 4 in such a way that the common contacts 61 are placed in opposed relation while the make-break contacts 62 are also placed in opposed relation. Terminals 64 and 65 are attached to the opposing side walls of the case 4 with setscrews 66 and 67, and electrically contact with the common contacts 61, respectively, as best shown in FIG. 25. Attached on the opposing side surfaces of the operating shaft 5 are brush assemblies 71 and 72 each provided with a brush for contact with the common contact 61 and a brush 70 for contact with the make-break contacts 63. That is, the brush assemblies 71 and 72 are attached with setscrews 73 and 74, respectively, as best shown in FIG. 25, which are screwed into suitable screw holes 68 formed in the operating shaft 5. When the operating shaft 5 is depressed and then returned, the brushes 69 make sliding contact with the common contacts 61 while the brushes 70 make intermittent sliding contact with the make-break contacts 63. The number of contacts of the brushes 70 with their mating make-break contacts 63 is equal to the number of the number pulses generated.

The advantages of the present invention may be summarized as follows:

1. Since a mechanical mechanism is employed to generate the pulses, the manufacturing cost may be remarkably reduced; stable and dependable operation may be ensured; and the replacements of the parts may be much facilitated.

2. The pulses are generated in the return stroke of the operating shaft and the returning speed of the operating shaft is constant, so that the pulse spacing may be maintained constant.

3. The position of the brush or brush assembly which makes contact with the make-break contacts may be suitably adjusted as a plurality of screw holes are provided on the operating shaft or the push-button cases so that the number of number pulses to be generated in the return stroke of the operating shaft may be varied in a simple manner as desired.

4. The terminals are provided with an elongated slot so that their positions with respect to the printed circuit board may be suitably adjusted even when the position of the brush or brush assembly which makes contact with the make-break contacts is changed.

5. The pulse generating switches (A) may be fabricated as a unit so that the assembly may be much facilitated, and a number of pulse generating switches to be assembled into a unitary construction is not limited.

6. Since the case and operating shaft of the pulse generating switch unit have a polygonal cross sectional configuration, may common contact or contacts and groups of make-break contacts may be attached upon the side surfaces of the operating shaft or upon the inner side surfaces of the switch case. Therefore the design of these contacts is free in configuration and dimension so that a large number of number pulses may be generated within a relatively short return stroke of the operating shaft.

7. The operating shaft is operatively coupled through its lateral projection to the comb-shaped connecting rod so that the latter may be rotated as the operating shaft is depressed and then released. Thus the operations of a plurality of operating shafts may be transmitted through the single connecting rod to push-break return-make switch unit and to the end pulse generating switch unit.

8. The terminals are connected to the printed circuit board to derive the pulses so that the assembly may be facilitated and the number of steps in assembly may be reduced.

9. The contact arm of the end pulse generating switch unit is made of an elastic metal, and is pressed in the form of an arc against the stationary contact 35 under the force of its own relisilient force, and attached to the connecting rod for rotation in unison therewith, so that the contact arm may be contact the stationary contact slightly before the operating shaft has been completely returned to its initial position. Therefore, the positive contact of the contact arm with the mating contact during the contact between the movable and stationary contacts of the push-break return-make switch unit may be ensured so that the positive generation of the end pulse at a time immediately before the push-break return-make switch is opened may be ensured.

What is claimed is:

1. A push-button type pulse generating switch comprising
   a. pulse generating switching means including an operating shaft for generating number pulses in the return stroke of said operating shaft,
   b. end pulse generating switching means electrically connected in parallel to said pulse generating switching means for generating an end pulse in response to the end of said return stroke
   c. push-break return-make switching means electrically connected in series to both said pulse generating switching means and said end pulse generating switching means for disabling said pulse generating switching means in response to the forward stroke of said operating shaft and for energizing said pulse generating switching means and said end pulse generating switching means in response to the return stroke of said operating shaft, and
   d. the number pulses and the end pulse thereby being generated when said push-break return-make switching means is closed in said return stroke of said operating shaft.

2. A push-button type pulse generating switch as set forth in claim 1 wherein
   said pulse generating switching means comprises
   a case into which is axially slidably fitted said operating shaft,
   a common contact attached upon one side surface at the lower portion of said operating shaft,
   a plurality of make-break contact groups attached to the remaining side surfaces of said operating shaft, respectively, and made into electrical connection with said common contact, each of said make-break contact groups consisting of a plurality of make-break contacts vertically spaced apart from each other by a suitable distance, and
   first brush means attached to said case for making electrical contact with said common contact and second brush means for making electrical contact with said make-break contacts.

3. A push-button type pulse generating switch as set forth in claim 2 wherein
   said first brush means in contact with said common contact is attached to said case together with a first terminal while said second brush means for contact with said make-break contacts is attached to said case with a second terminal.

4. A push-button type pulse generating switch as set forth in claim 3 wherein said case is provided with a plurality of attachment holes arrayed in one column in parallel with the direction of the stroke of said operating shaft,
   said second terminal is provided with an elongated slot whose axis is in parallel with said direction of the stroke of said operating shaft, and
   said second terminal and said second brush means for contact with said make-break contacts are attached to said case with attachment means extended through said elongated slot of said second terminal into one of said plurality of attachement holes of said case so that the position of said second brush means for contact with said make-break contacts may be adjusted in said direction of the stroke of said operating shaft.

5. A push-button type pulse generating switch as set forth in claim 1 wherein
said operating shaft and a case of said pulse generating switching means have a polygonal cross sectional configuration.
said operating shaft is axially slidably fitted into said case,
a plurality of ring-shaped contacts are attached around the side surface of said operating shaft, and are vertically spaced apart from each other by a suitable distance, and
at least one pair of brushes for contact with said contacts are attached to said case in such a way that their positions may be adjustable in the axial direction of said operating shaft.

6. A push-button type pulse generating switch as defined in claim 1 wherein
said pulse generating switching means comprises
a case into which is axially slidably fitted said operating shaft,
a common contact attached to the inner surface of said case,
a plurality of independent make-break contacts attached to the inner surface of said case and electrically isolated from said common contact, and brushes attached to the outer surface of said operating shaft for contact with said common contact and said make-break contacts.

7. A push-button type pulse generating switch as set forth in claim 1 wherein
said operating shaft and case of said pulse generating switching means have a polygonal cross sectional configuration,
said operating shaft is axially slidably fitted into said case,
a common contact is attached upon one of the inner side surfaces of said case,
a plurality of make-break contact groups each comprising a plurality of vertically equidistantly spaced apart and electrically interconnected make-break contacts are attached upon the remaining inner side surfaces of said case.

8. A push-button type pulse generating switch as set forth in claim 1 wherein said pulse generating switching means comprises
a case into which said operating shaft is fitted, and a bias spring is loaded between the top wall of said case through which said operating shaft is extended and a spring seat means attached to the outer surface of said operating shaft close to the upper end thereof, whereby said operating shaft is biased upwardly.

9. A push-button type pulse generating switch as set forth in claim 1 wherein
said push-break return-make switching means comprises a connecting rod which is rotated about its axis in response to the stroke of said operating shaft in its axial direction,
a rotary disk loosely carried by said connecting rod at its one end and provided with a projection radially outwardly extending from the periphery of said rotary disk, a notch formed in the periphery thereof, and two projections extending from the outer side surface of said rotary disk and spaced apart from each other by a predetermined distance,
a movable contact attached to the free end of said radial projection,
a stationary contact with which is made into contact said movable contact when said rotary disk is rotated,
a pawl means engageable with said notch of said rotary disk, thereby limiting the rotation thereof, and
a driving lever carried at said one end of said connecting rod for rotation in unison therewith in such a way that the free end portion of said driving lever may be interposed between said two projections of said rotary disk.

10. A push-button type pulse generating switch as set forth in claim 9 wherein
said connecting rod has a plurality of teeth which extend laterally of the axis of said connecting rod and operatively engage with a projection of said operating shaft which extends laterally of the axis thereof, whereby said connecting rod is caused to rotate about its axis when said operating shaft is moved in its axial direction.

11. A push-button type pulse generating switch as set forth in claim 9 wherein the angle of rotation of said rotary disc is less than the angle of rotation of said connecting rod.

12. A push-button type pulse generating switch as set forth in claim 10 wherein
a bias spring is loaded in such a way that said teeth of said connecting rod may be pressed against said projection of said operating shaft; and
said bias spring being loaded in such a way that said driving lever may be normally against the peripherey of said rotary disk.

13. A push-button type pulse generating switch as set forth in claim 1 wherein
said end pulse generating switching means comprises
a. a contact arm whose one end is attached to the other end of a connecting rod for rotation in unison therewith, and
b. a stationary contact for mating with said contact arm.

14. A push-button type pulse generating switch as set forth in claim 13 wherein said contact arm is made of an elastic metal.

15. a push-button type pulse generating switch as set forth in claim 1 further comprising an
operating arm of said pulse generating switching means axially slidably fitted into a case,
said case is extended through and attached to the top and bottom walls of a casing comprising top and bottom walls and side walls, and
output terminals of said pulse generating switching means are connected to a printed circuit board attached to said casing.

16. A push-button type pulse generating switch as set forth in claim 6 wherein
said case is extended through and attached to top and bottom walls of a casing consisting of said top and bottom walls and side walls, and
terminals which are connected to said brushes of said pulse generating switching means are connected to a printed circuit board attached to said casing.

17. A push-button type pulse generating switch means comprising a. a casing having a top wall, a bottom wall and side walls;
b. pulse generating switching means for generating the number pulses in the return stroke of an operating shaft which reciprocates in its axial direction within a case extended through and attached to said top and bottom walls of said casing;
c. end pulse generating means electrically connected in parallel to said pulse generating switching means;
d. push-break return-make switching means electrically connected in series to the parallel circuit consisting of said pulse generating switching means and said end pulse generating means;
e. said pulse generating switching means comprises a common contact attached to one side surface of said operating shaft at the lower portion thereof, a plurality of make-break contacts attached to other side surfaces of said operating shaft and electrically connected to said common contact, and a first brush attached to said case for contact with said common contact and a second brush attached to said case for contact with said make-break contacts, respectively;
f. said push-break return-make switching means comprising a connecting rod supported between said side walls of said casing for rotation in response to the reciprocation of said operating shaft,
a rotary disk loosely carried by said connecting rod at its one end and provided with two stops extending from the outer side surface of said rotary disk and spaced apart from each other by a predetermined distance and with a projection outwardly radially extended from the periphery of said rotary disk,
a movable contact attached to the free end of said radial projection,
a stationary contact attached to one of said side walls for mating with said movable contact when said rotary disk is rotated in one direction, a notch being formed at the periphery of said rotary disk, a pawl means slightly attached to said one of said side walls for engagement with said notch of said rotary disk, and a driving lever carried at one end of said connecting rod for rotation in unison therewith, the free end of said driving lever being interposed between said two stops of said rotary disk; and
g. said end pulse generating means comprises a contact arm carried at the other end of said connecting rod for rotation in unison therewith, and a stationary contact attached to the other side wall for mating with said contact arm when said connecting rod is rotated.

18. A push-button type pulse generating switch means comprising
a. a casing having a top wall, a bottom wall and side walls;
b. pulse generating switching means for generating the number pulses in the return stroke of an operating shaft which reciprocates in its axial direction within a case extended through and attached to said top and bottom walls of said casing;
c. end pulse generating means electrically connected in parallel to said pulse generating switching means;
d. push-break return-make switching means electrically connected in series to the parallel circuit consisting of said pulse generating switching means and said end pulse generating means;
e. said pulse generating switching means comprises a common contact attached to one inner side surface of said case, a plurality of make-break contacts attached to another inner side surface of said case and electrically connected to said common contact, and a first brush attached to the outer side surfaces of said operating shaft for contact with said common contact and a second brush attached to the outer side surfaces of said operating shaft for contact with said make-break contacts;
f. said push-break return-make switching means comprising a connecting rod supported between said side walls of said casing for rotation in response to the reciprocation of said operating shaft,
a rotary disk loosely carried by said connecting rod at its one end and provided with two stops extended from the outer side surface of said rotary disk and spaced apart from each other by a predetermined distance and with a projection outwardly radially extended from the periphery of said rotary disk,
a movable contact attached to the free end of the radially outwardly extended projection,
a stationary contact attached to one of said side walls for mating with said movable contact when said rotary disk is rotated in one direction, a notch being formed at the periphery of said rotary disk, a pawl means swingably attached to said one side wall for engagement with said notch of said rotary disk, and
a driving lever carried at one end of said connecting rod for rotation in unison therewith, the free end of said driving lever being interposed between said two stops of said rotary disk; and
g. said end pulse generating switching means comprises a contact arm carried at the other end of said connecting rod for rotation in unison therewith, and a stationary contact attached to the other side wall for mating with said contact arm when said connecting rod is rotated.

19. A push-button type pulse generating switch means as set forth in claim 17 wherein
a plurality of said pulse generating switching means are incorporated, and
said connecting rod is caused to rotate in response to the stroke of each pulse generating switching means.

20. A push-button type pulse generating switch means as set forth in claim 18 wherein
a plurality of said pulse generating switching means are incorporated, and
said connecting rod is caused to rotate in response to the stroke of each pulse generating switching means.

21. A push-button type pulse generating switch means as set forth in claim 17 wherein
said first brush with said common contact is attached to said case together with a first terminal,
said second brush for contact with said make-break contacts is attached to said case together with a second terminal,
a plurality of attachment holes are formed through said case in parallel with the direction of the operating shaft, said second terminal is provided with an elongated slot extending in parallel with the direction of the reciprocation of said operating shaft, and said second brush for contact with said make-break contacts and said second terminal are attached to said case with joining means extending through said elongated slot of said second terminal into one of said attachment holes so that the positions of said first brush for contact with said make-break contacts and said second terminal may be adjusted in the direction in parallel with the direction of the reciprocation of said operating shaft.

22. A push-button type pulse generating switch means as set forth in claim 18 wherein said operating shaft has a plurality of attachment holes formed in the side surface thereof where said second brush for contact with said make-break contacts is attached and arrayed in column in the axial direction of said operating shaft and spaced apart from each other by a suitable distance, said second brush for contact with said make-break contacts is attached to said side surface of said operating shaft with joining means which is made into engagement with one of said plurality of attachment holes, whereby the position of said second brush for contact with said make-break contacts may be adjustable in the direction in parallel with the direction of the reciprocation of said operating shaft.

23. A push-button type pulse generating switch means as set forth in claim 21 wherein a plurality of said pulse generating switching means are extended through and attached to said top and bottom walls of said casing, and the terminals of said plurality of said pulse generating switching means are connected to a printed circuit board attached to said casing.

24. A push-button type pulse generating switch means as set forth in claim 22 wherein a plurality of said pulse generating switching means are extended through and attached to said top and bottom walls of said casing, and the terminals of said plurality of pulse generating switching means are connected to a printed circuit board attached to said casing.

* * * * *

UNITED STATES PATENT OFFICE
CERTIFICATE OF CORRECTION

Patent No. 4,010,382  Dated March 1, 1977

Inventor(s) Nishioka, et al

It is certified that error appears in the above-identified patent and that said Letters Patent are hereby corrected as shown below:

Column 1, line 17: After "present" insert --invention--.

Column 2, line 61: Change "section" to --sectional--.

Column 3, line 51: Change "connected" to --connecting--.

line 52: Change "suppored" to --supported--.

line 53: Change "wall" to --walls--.

line 64: Delete "is".

Column 4, line 13: Change "28d" to --28a--.

Column 5, line 5: Change "rotated" to --rotate--.

line 7: Change "28" to --26--.

line 24: After "position," insert --the movable--.

UNITED STATES PATENT OFFICE
CERTIFICATE OF CORRECTION

Patent No. 4,010,382  Dated March 1, 1977

Inventor(s) Nishioka, et al

It is certified that error appears in the above-identified patent and that said Letters Patent are hereby corrected as shown below:

Column 5, line 39: Change "and and end" to --and the end--.

line 58: Change "screws" to --screw--.

Column 6, line 29: Change "cases" to --case--.

line 34: Change "60" to --50--.

Column 7, line 27: Change "cases" to --case--.

Signed and Sealed this

Fourth Day of October 1977

[SEAL]

Attest:

RUTH C. MASON  
Attesting Officer

LUTRELLE F. PARKER  
Acting Commissioner of Patents and Trademarks